United States Patent
Shouji

(10) Patent No.: US 9,712,794 B2
(45) Date of Patent: Jul. 18, 2017

(54) PROJECTOR INCLUDING IMAGE FORMING UNITS AND FIRST AND SECOND OPTICAL SYSTEMS

(71) Applicant: NEC Display Solutions, Ltd., Tokyo (JP)

(72) Inventor: Eisaku Shouji, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 14/787,741

(22) PCT Filed: Jun. 13, 2013

(86) PCT No.: PCT/JP2013/066342
§ 371 (c)(1),
(2) Date: Oct. 28, 2015

(87) PCT Pub. No.: WO2014/199487
PCT Pub. Date: Dec. 18, 2014

(65) Prior Publication Data
US 2016/0088274 A1    Mar. 24, 2016

(51) Int. Cl.
*H04N 9/31* (2006.01)
*G03B 21/20* (2006.01)
(Continued)

(52) U.S. Cl.
CPC ....... *H04N 9/3158* (2013.01); *G02B 27/1033* (2013.01); *G02B 27/126* (2013.01);
(Continued)

(58) Field of Classification Search
CPC ...... G03B 21/006; G03B 21/14; G03B 21/28; H04N 9/3105; H04N 9/3158; H04N 9/3164; G02B 5/203; G02B 26/0833
See application file for complete search history.

(56) References Cited

U.S. PATENT DOCUMENTS 6,382,799 B1 *  5/2002  Nishikawa ............. G02B 5/203
                                                      348/40
8,690,338 B2 *  4/2014  Okumura ............... G03B 21/28
                                                      349/5
(Continued)

FOREIGN PATENT DOCUMENTS

JP    2009-180908 A    8/2009
JP    2010-513981 A    4/2010
(Continued)

OTHER PUBLICATIONS

International Search Report (ISR) (PCT Form PCT/ISA/210), in PCT/JP2013/066342, dated Jul. 30, 2013.

*Primary Examiner* — Sultan Chowdhury
(74) *Attorney, Agent, or Firm* — McGinn IP Law Group, PLLC

(57) ABSTRACT

A projector has a light source, image forming units, a projection lens, a first optical system and a second optical system. The image forming units form image light by adjusting, on a per-pixel basis, the intensity of light emitted by the light source. The projection lens projects the image light formed by the image forming units to the outside. The first optical system guides light of a first wavelength emitted by the light source to the projection lens, and the second optical system guides light of a second wavelength emitted by the light source to the projection lens. The f-number of the first optical system is higher than the f-number of the second optical system.

8 Claims, 4 Drawing Sheets

(51) Int. Cl.
   *G02B 27/10*   (2006.01)
   *G02B 27/14*   (2006.01)
   *H04N 5/74*    (2006.01)
   *G02B 27/12*   (2006.01)
   *G02B 26/08*   (2006.01)

(52) U.S. Cl.
   CPC ......... *G02B 27/141* (2013.01); *G03B 21/204* (2013.01); *G03B 21/208* (2013.01); *G03B 21/2013* (2013.01); *H04N 5/7458* (2013.01); *H04N 9/3105* (2013.01); *H04N 9/317* (2013.01); *H04N 9/3164* (2013.01); *G02B 26/0833* (2013.01)

(56)  References Cited

U.S. PATENT DOCUMENTS

| | | | | |
|---|---|---|---|---|
| 2003/0193650 A1* | 10/2003 | Sugawara | ............ | G03B 21/006 353/31 |
| 2008/0079911 A1* | 4/2008 | Liu | ...................... | G03B 21/008 353/84 |
| 2010/0238416 A1* | 9/2010 | Kuwata | .................. | G03B 21/10 353/69 |
| 2012/0092626 A1* | 4/2012 | Chang | .................... | G03B 21/14 353/38 |

FOREIGN PATENT DOCUMENTS

| JP | 2012-159556 A | 8/2012 |
|---|---|---|
| JP | 2013-033226 A | 2/2013 |

\* cited by examiner

PROJECTOR INCLUDING IMAGE FORMING UNITS AND FIRST AND SECOND OPTICAL SYSTEMS

TECHNICAL FIELD

The present invention relates to a projector that has image forming units that adjust the intensity of light on a per-pixel basis and form image light.

BACKGROUND ART

A projector is provided with a light source that emits red light, green light, and blue light, image forming units that form image light by modulating the intensity of the light of each color, and a projection lens that enlarges and projects the image light to the outside (Patent Document 1). Reflective image formation elements such as digital micromirror devices (DMDs) can be used as the image forming units.

A DMD has micromirror elements equal in number to the pixels. Each mirror element is configured to allow rotation of a predetermined angle around a rotational axis. Light that is irradiated to a mirror element inclined in a particular direction is reflected in the direction in which the projection lens is arranged. Light that is irradiated upon a mirror element inclined in a different direction is reflected in a direction in which the projection lens is not arranged. In this way, each individual mirror element of the DMD selects whether or not the light corresponding to a respective pixel is to be guided to the projection lens. By the implementation of this control over the light of each color by the DMD, the projector is able to display on a screen image light that has passed through the projection lens.

LITERATURE OF THE PRIOR ART

Patent Documents

Patent Document 1: Japanese Unexamined Patent Application Publication No. 2012-159556

SUMMARY OF THE INVENTION

Problem to be Solved by the Invention

The image forming units of the projector adjust the intensity of light on a per-pixel basis. With the reduction of the pixel pitch in recent years, the phenomenon of light diffraction occurs in image forming units. The diffraction phenomenon causes spreading of the luminous flux of red light, green light, and blue light that has passed through the image forming units, thereby giving rise to the phenomenon that this luminous flux diverges from the pupil of the projection lens. In particular, when DMDs are used for the image forming units, the narrowing of the pitch of the multiplicity of micromirrors causes occurrence of the diffraction phenomenon.

FIG. 1 is a schematic view showing the position of spot where green light and blue light is irradiated to the projection lens and the pupil of the projection lens. FIG. 2 is a schematic view showing the position of the spot where red light is irradiated to the projection lens and the pupil of the projection lens. The red light has a longer wavelength than green light and blue light, and the degree of diffraction is therefore greater. As a result, even when the position of spot 56 where green light and blue light it is irradiated to a projection lens is within pupil 52 of the projection lens (see FIG. 1), a portion of red light 58 may diverge from pupil 52 of the projection lens (see FIG. 2).

Due to this divergence, the intensity of red light that is irradiated into the pupil of the projection lens drops. As a result, unevenness of color may occur in the image light that is projected from the projection lens, i.e., the synthesized red light, green light and blue light.

A projector is therefore desired that can mitigate the color unevenness of the synthesized light that is projected from the projection lens.

Means for Solving the Problem

A projector in an exemplary embodiment of the present invention has a light source, image forming units, a projection lens, a first optical system, and a second optical system. The image forming units adjust the intensity of light emitted from the light source for each pixel and form image light. The projection lens projects image light that was formed in the image forming units to the outside. The first optical system guides light of a first wavelength that is emitted from the light source to the projection lens. The second optical system guides light of a second wavelength that is emitted from the light source to the projection lens. The f-number of the first optical system is greater than the f-number of the second optical system.

The present invention enables a reduction of color unevenness of the synthesized light of the first wavelength and the light of the second wavelength that is projected from the projection lens.

MODE FOR CARRYING OUT THE INVENTION

Exemplary embodiments of the present invention are next described with reference to the accompanying drawings.

Figure 1:
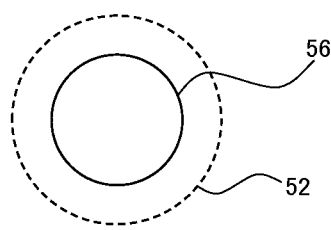
FIG. 1 is a schematic view showing the position of the spot where green light and blue light is irradiated to the projection lens and the pupil of the projection lens.
Figure 2:
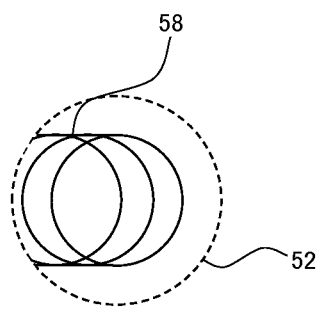
FIG. 2 is a schematic view showing the position of the spot where red light is irradiated to the projection lens and the pupil of the projection lens.
Figure 3:
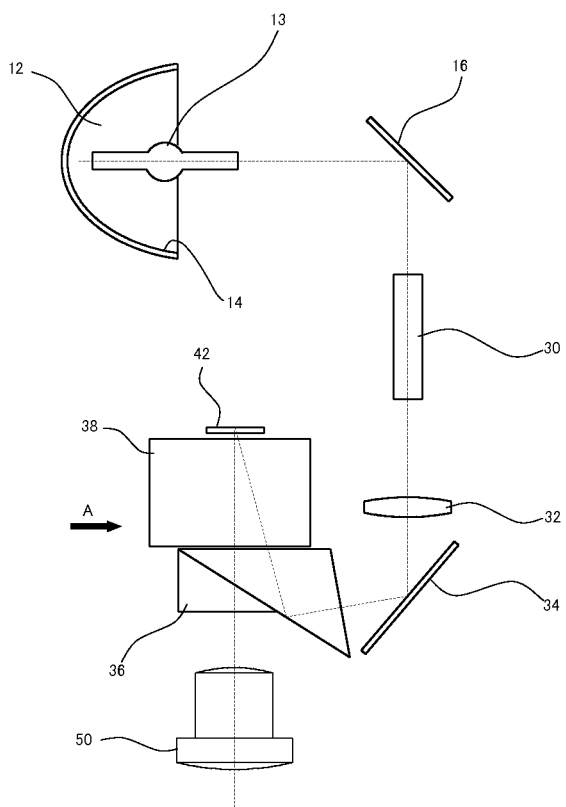
FIG. 3 shows the schematic configuration of the projector in the first exemplary embodiment.

FIG. 3 shows the configuration of the projector according to the first exemplary embodiment of the present invention. The projector has light source 12, image forming unit 42 that adjusts the intensity of light for each pixel to form image light, and projection lens 50 that projects the image light that was formed in the image forming unit to the outside.

Light source 12 is a lamp that emits white light that contains red light, green light, and blue light. This lamp is provided with light emitting unit 13 that produces white light and reflector 14 that reflects light that is emitted to the rear of the light emitting unit in the forward direction.

The light that is emitted from light source 12 is reflected by mirror 16 and irradiated into integrator 30 that makes the illuminance distribution of the light uniform. A rod integrator can be used as integrator 30.

The light that is emitted from integrator 30 passes through relay lens 32 and is reflected by reflecting mirror 34. The light that has been reflected by reflecting mirror 34 is irradiated into TIR prism 36. The light that is irradiated into TIR prism 36 undergoes total reflection inside TIR prism 36 and is irradiated into color prism 38 that is a separating/synthesizing optical system.

Figure 4:
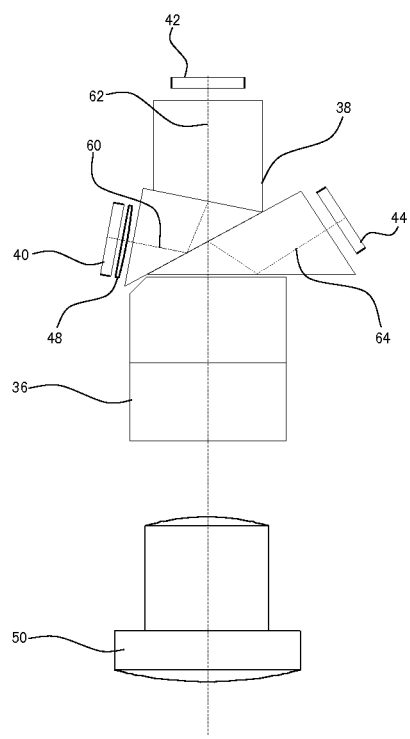
FIG. 4 shows the configuration in the vicinity of the image forming units as seen from the direction of arrow A of FIG. 3.

FIG. 4 shows the configuration in the vicinity of the image forming units as seen from the direction of arrow A of FIG. 3. Color prism 38 separates the colors of white light into red light, green light, and blue light. In FIG. 4, light path 60 of red light, light path 62 of green light, and light path 64 of blue light are indicated by the dotted lines. In FIG. 3, for the sake of convenience, only the light path of green light that has undergone color separation in color prism 38 is indicated by the dotted line.

The green light that has undergone color separation in color prism 38 is irradiated into image formation element 42 for green light. The blue light that has undergone color separation in color prism 38 is irradiated into image formation element 44 for blue light. Finally, the red light that has undergone color separation in color prism 38 is irradiated into image formation element 40 for red light. These image formation elements 40, 42, and 44 are reflective image formation elements and use, for example, DMDs or reflective liquid crystal devices. Because DMDs are used in the present exemplary embodiment, image formation elements 40, 42, and 44 are described as DMDs 40, 42, and 44.

A DMD is a semiconductor projection device provided with a multiplicity of micromirrors disposed in matrix form. Each micromirror corresponds to a pixel of the projected image light. The angle of each micromirror can be adjusted. Light that is irradiated into a micromirror having a particular inclination (ON state) is reflected toward projection lens 50 and enlarged and cast upon a screen (not shown).

More specifically, green light, red light, and blue light that are irradiated into micromirrors in the ON state are again irradiated into color prism 38 and synthesized in color prism 38. The synthesized light (image light) that has been synthesized in color prism 38 passes through TIR prism 36 and projection lens 50 and then cast upon the screen.

Light that is irradiated into a micromirror having a different angle (OFF state) is reflected in a different direction from projection lens 50 and is not cast upon the screen. The gradation value of each pixel of image light that is cast upon the screen can be adjusted by changing the time ratio of the ON state and OFF state in each micromirror. Projection lens 50 projects the image light formed by DMDs 40, 42, and 44 onto the screen.

In the projector of the present exemplary embodiment, red light, green light, and blue light are emitted from the same light source 12. The light paths of the red light, green light and blue light from light source 12 to color prism 38 are mutually identical. Because the red light, green light and blue light undergo color separation in color prism 38, the light paths of red light, green light and blue light are partially different.

In the projector of the present exemplary embodiment, convex lens 48 is provided between image formation element 40 for red light and color prism 38. The red light that has passed through color prism 38 is thus transmitted through convex lens 48 and then irradiated into image formation element 40. In addition, the red light that is reflected by image formation element 40 is transmitted through convex lens 48 and then irradiated into color prism 38.

Mirror 16, integrator 30, relay lens 32, reflecting mirror 34, TIR prism 36, color prism 38 and convex lens 48 that guide the red light emitted from light source 12 to projection lens 50 make up the first optical system. In addition, mirror 16, integrator 30, relay lens 32, reflecting mirror 34, TIR prism 36 and color prism 38 that guide the green light and blue light emitted from light source 12 to projection lens 50 make up the second optical system. The f-number of the first optical system is greater than the f-number of the second optical system. This difference is due to the provision of convex lens 48 between image forming element 40 for red light and color prism 38.

Due to the longer wavelength of red light, the degree of diffraction of red light in DMD 40 is greater than the degree of diffraction of green light and blue light in DMDs 42 and 44. In the present exemplary embodiment, however, the f-number of the first optical system arranged on the light path of red light is greater, and divergence of red light from the pupil of projection lens 50 can therefore be prevented. As a result, image light made up of red light, green light, and blue light reaches the screen without diverging from the pupil of projection lens 50, and the distribution of each color on the screen is therefore made uniform. As a result, color unevenness of the synthesized red light, green light and blue light that are projected from projection lens 50 can be reduced.

When the f-numbers of the optical system that is arranged on the light path of red light, the optical system that is arranged on the light path of green light, and the optical system that is arranged on the light path of blue light are all made large, the brightness of the synthesized light (image light) that is projected by projection lens 50 is greatly reduced. In the above-described configuration, only the f-number of the first optical system that is arranged on the light path of red light is large and the overall brightness of the synthesized light can therefore be maintained.

In the first exemplary embodiment, light source 12 emits white light that contains red light, green light, and blue light. However, light source 12 may also emit light that contains light of a first wavelength and light of a second wavelength that is shorter than the first wavelength. When the light of the first wavelength is here red light, the light of the second wavelength may be green light, blue light, or synthesized light of green light and blue light.

Figure 5:
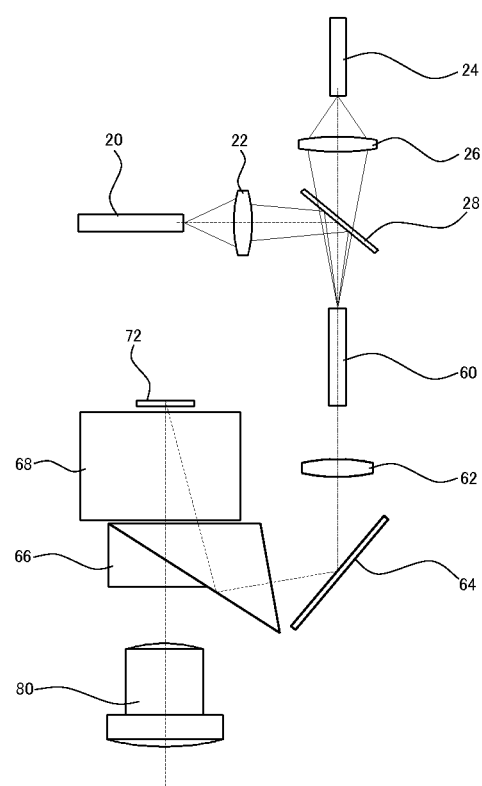
FIG. 5 shows the schematic configuration of the projector in the second exemplary embodiment.

FIG. 5 shows the configuration of a projector according to the second exemplary embodiment of the present invention. This projector has a light source, image forming unit 42 that adjusts the intensity of light emitted from the light source on a per-pixel basis to form image light, and projection lens 80 that projects the image light that was formed in the image forming unit to the outside. In the present exemplary embodiment, the light source is divided into first light source 20 and second light source 24.

First light source 20 and second light source 24 are fiber light sources and the configuration of these light sources can be varied. First light source 20 and second light source 24 may be solid-state light sources such as laser light sources, LED light sources, or fluorescent light sources that include a phosphor.

In the present exemplary embodiment, first light source 20 emits red light. Second light source 24 emits synthesized green light and blue light. The red light emitted from first light source 20 passes through first lens 22 to be irradiated into synthesizing optical system 28. The synthesized green light and blue light that is emitted from second light source 24 passes through second lens 26 to be irradiated into synthesizing optical system 28. The red light, green light and blue light are synthesized in synthesizing optical system 28 and become white light.

Synthesizing optical system 28 may be a dichroic mirror. In this case, the dichroic mirror has high reflectance with respect to light of the red wavelength band and has high transmittance with respect to light of the green wavelength band and blue wavelength band.

The light that is synthesized by synthesizing optical system 28 is irradiated into integrator 60 that makes the illuminance distribution of the light uniform. A rod integrator can be used as integrator 60.

The light that is emitted from integrator 60 passes through relay lens 62 and is reflected by reflecting mirror 64. The light that is reflected at reflecting mirror 64 is irradiated into TIR prism 66. The light that is irradiated into TIR prism 66 undergoes total reflection inside the prism and is then irradiated into color prism 68 that is a separating/synthesizing optical system.

Color prism 68 separates the colors of white light into red light, green light and blue light. In FIG. 5, for the sake of convenience, only the light path of green light that has undergone color separation in color prism 68 is shown by the dotted line. The configuration in the vicinity of the image forming unit of the projector in the second exemplary embodiment is substantially identical to the configuration shown in FIG. 4. However, in the second exemplary embodiment, a convex lens is not provided between the image formation element for red light and the color prism.

The red light that has undergone color separation in color prism 68 is irradiated into the image formation element for red light. The green light that has undergone color separation in color prism 68 is irradiated into image formation element 72 for green light. The blue light that has undergone color separation in color prism 68 is irradiated into the image formation element for blue light. These image formation elements are reflective image formation elements, and components such as DMDs or reflective liquid crystal devices may be used. In the present exemplary embodiment, DMDs are used.

The red light, green light, and blue light that are reflected at the image formation elements are again irradiated into color prism 68 and synthesized in color prism 68. The synthesized light (image light) that has been synthesized in color prism 68 passes through TIR prism 66 and projection lens 80 and is projected upon a screen.

In the projector of the second exemplary embodiment, the synthesized light that has been synthesized in synthesizing optical system 28 passes through integrator 60 and is irradiated into color prism 68. The light paths from integrator 60 up to color prism 68 are common. Because light source 20 that emits the red light and light source 24 that emits the green light and blue light are different, the light paths of the red light and the green light and blue light are partially different.

First lens 22, synthesizing optical system 28, integrator 60, relay lens 62, reflecting mirror 64, TIR prism 66, and color prism 68 that guide the red light that is emitted from first light source 20 make up the first optical system. Second lens 26, synthesizing optical system 28, integrator 60, relay lens 62, reflecting mirror 64, TIR prism 66 and color prism 68 that guide the green light and blue light that are emitted from second light source 24 make up the second optical system. The curvature of first lens 22 and the curvature of second lens 26 are set such that the f-number of the first optical system is greater than the f-number of the second optical system.

In this case as well, the divergence of red light from the pupil of projection lens 80 can be prevented, as in the first exemplary embodiment. As a result, color unevenness of the synthesized light of the red light, green light and blue light that is projected from projection lens 80 can be reduced.

In the second exemplary embodiment, first light source 20 emits red light and second light source 24 emits synthesized light of green light and blue light. However, first light source 20 may also emit light of a first wavelength and second light source 24 may emit light of a second wavelength that is shorter than the first wavelength. The first wavelength and the second wavelength are set as appropriate according to the configuration of the projector. When the light of the first wavelength is red light, the light of the second wavelength may be green light, blue light, or synthesized green light and blue light.

Although exemplary embodiments of the present invention have been presented and described in detail, it should be understood that the present invention is not limited to the above-described exemplary embodiments and is open to various amendments and modifications that do not depart from the gist of the present invention.

EXPLANATION OF REFERENCE NUMBERS 12 light source
20 first light source
22 first lens
24 second light source
26 second lens
30, 60 integrator
36, 66 TIR prism
38, 68 color prism
40, 42, 44 image formation element
48 convex lens
50, 80 projection lens

What is claimed is:

1. A projector comprising:
a light source;
image forming units that adjust an intensity of light emitted from said light source on a per-pixel basis and form image light;
a projection lens that projects image light that is formed in said image forming units to an outside;
a first optical system that guides light of a first wavelength that is emitted from said light source to said projection lens; and
a second optical system that guides light of a second wavelength that is emitted from said light source to said projection lens;
wherein an f-number of said first optical system is greater than an f-number of said second optical system, wherein:
said image forming units include: a first image formation element that forms image light of said first wavelength that is irradiated on said projection lens and a second image formation element that forms image light of said second wavelength that is irradiated on said projection lens;
said first optical system and said second optical system guide light of said first wavelength to said first image formation element, guide light of said second wavelength to said second image formation element, and have a common separating/synthesizing optical system that synthesizes light of said first wavelength and light of said second wavelength that are reflected by said first and second image formation elements; and said first optical system includes a convex lens between said separating/synthesizing optical system and said first image formation element.

2. The projector as set forth in claim 1, wherein said first image formation element and said second image formation element comprise digital micromirror devices.

3. The projector as set forth in claim 1, wherein said separating/synthesizing optical system comprises a color prism.

4. The projector as set forth in claim 1, further comprising:
an integrator that transmits synthesized light of said first wavelength and light of said second wavelength;
wherein light paths of said synthesized light from said integrator to said separating/synthesizing optical system are identical.

5. The projector as set forth in claim 1, wherein said first optical system and said second optical system partially have common optical components.

6. The projector as set forth in claim 1, wherein:
light of said first wavelength comprises red light; and
light of said second wavelength comprises green light, blue light, or synthesized light of green light and blue light.

7. A projector comprising:
a light source;
image forming units that adjust an intensity of light emitted from said light source on a per-pixel basis and form image light;
a projection lens that projects image light that is formed in said image forming units to an outside;
a first optical system that guides light of a first wavelength that is emitted from said light source to said projection lens; and
a second optical system that guides light of a second wavelength that is emitted from said light source to said projection lens;
wherein an f-number of said first optical system is greater than an f-number of said second optical system, wherein:
said light source includes a first light source that emits light of said first wavelength and a second light source that emits light of said second wavelength;
a synthesizing optical system is provided that synthesizes light of said first wavelength that is emitted from said first light source and light of said second wavelength that is emitted from said second light source;
said first optical system includes a first lens that is arranged between said first light source and said synthesizing optical system;
said second optical system includes a second lens that is arranged between said second light source and said synthesizing optical system; and
a curvature of said first lens and a curvature of said second lens are set such that the f-number of said first optical system is greater than the f-number of said second optical system.

8. The projector as set forth in claim 7, wherein:
said image forming units include a first image formation element that forms image light of said first wavelength that is irradiated on said projection lens and a second image formation element that forms image light of said second wavelength that is irradiated on said projection lens; and
said first optical system and said second optical system guide light of said first wavelength to said first image formation element, guide light of said second wavelength to said second image formation element, and have a common separating/synthesizing optical system that synthesizes light of said first wavelength and light of said second wavelength that are reflected by said first and second image formation elements.

* * * * *